(12) United States Patent
Toc et al.

(10) Patent No.: US 10,171,713 B1
(45) Date of Patent: Jan. 1, 2019

(54) METHOD OF ALIGNING LENS OPTICAL AXIS TO IMAGE SENSOR PLANE WITHOUT ACTIVE ALIGNMENT

(71) Applicant: Apple Inc., Cupertino, CA (US)

(72) Inventors: Howell John Chua Toc, Singapore (SG); Iain A. McAllister, Campbell, CA (US); Steven Webster, Singapore (SG)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 15/275,214

(22) Filed: Sep. 23, 2016

Related U.S. Application Data

(60) Provisional application No. 62/259,008, filed on Nov. 23, 2015.

(51) Int. Cl.
  *B32B 41/00* (2006.01)
  *H04N 5/225* (2006.01)

(52) U.S. Cl.
  CPC ......... *H04N 5/2252* (2013.01); *H04N 5/2253* (2013.01); *H04N 5/2254* (2013.01); *H04N 5/2257* (2013.01)

(58) Field of Classification Search
  CPC .. H04N 5/2252; H04N 5/2257; H04N 5/2254; H04N 5/2253
  USPC ........................... 156/64, 350, 351, 378, 379
  See application file for complete search history.

(56) References Cited

U.S. PATENT DOCUMENTS

| | | | |
|---|---|---|---|
| 4,893,927 A | 1/1990 | Miller | |
| 7,071,966 B2 | 7/2006 | Lu et al. | |
| 7,379,113 B2 | 5/2008 | Kong et al. | |
| 8,760,571 B2 | 6/2014 | Yee | |
| 8,786,713 B1 | 7/2014 | Tamasanis | |
| 8,908,091 B2 | 12/2014 | Yee | |
| 2012/0293670 A1 | 11/2012 | Chan et al. | |

(Continued)

FOREIGN PATENT DOCUMENTS

| | | |
|---|---|---|
| EP | 0587570 | 10/1999 |
| WO | 92/19069 | 10/1992 |

OTHER PUBLICATIONS

Triopitcs: ProCam Align-Active Alignment, Assembly and Testing of Camera Modules, 8 pages, 2015.

(Continued)

*Primary Examiner* — Michael N Orlando
*Assistant Examiner* — Joshel Rivera
(74) *Attorney, Agent, or Firm* — Womble Bond Dickinson (US) LLP

(57) ABSTRACT

A tracking code is applied to a lens housing that holds one more lenses. A back focus distance and a tilt of an optical axis with respect to a datum of the lens housing is electronically recorded. A position of an image sensor surface of an image sensor mounted on a substrate is measured. The lens housing is positioned such that the optical axis is perpendicular to the image sensor surface using the measured position of the image sensor surface and the electronically recorded optical data for the lens housing. The lens housing is positioned along the optical axis such that the lenses are separated from the image sensor surface using the measured position of the image sensor surface and the electronically recorded back focus distance for the tracking code of the lens housing. The lens housing is joined to the substrate with an adhesive.

20 Claims, 5 Drawing Sheets

(56) References Cited

U.S. PATENT DOCUMENTS

2013/0047396 A1    2/2013  Au et al.
2013/0293765 A1*  11/2013  Lipson ................... G03B 3/10
                                                    348/345

OTHER PUBLICATIONS

Peterman, Derrick, "Scanning Slit Profiler for Characterizing Optical Assemblies", Photon Inc., 2 pages, Nov. 2003.
Winters, Daniel, "Image Quality Testing Improves as Cameras Advance", Photonics Spectra, 3 pages, Jan. 2014.

* cited by examiner

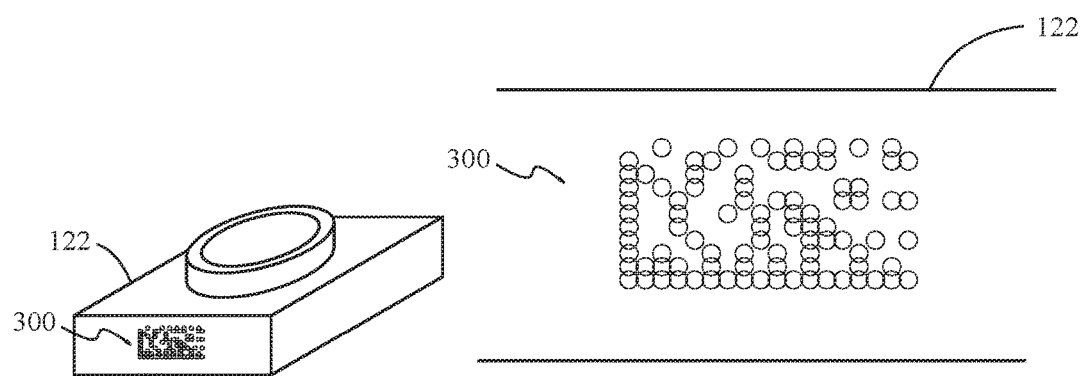
*FIG. 3A*
*FIG. 3B*
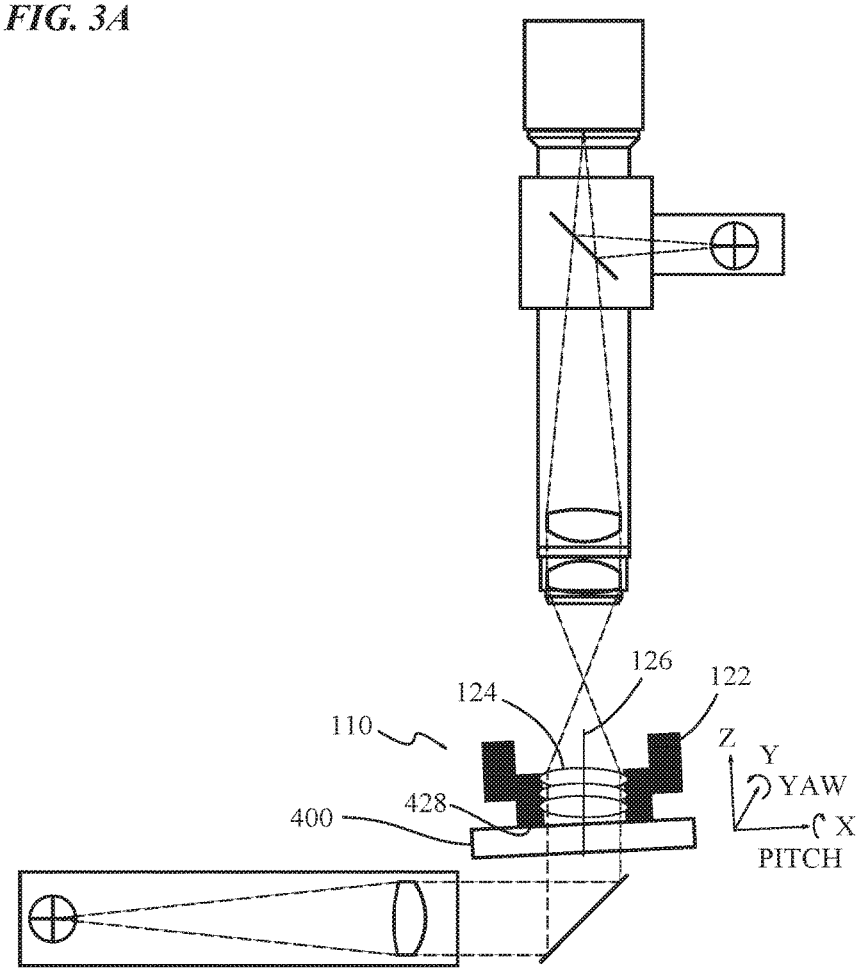
*FIG. 4*

METHOD OF ALIGNING LENS OPTICAL AXIS TO IMAGE SENSOR PLANE WITHOUT ACTIVE ALIGNMENT

BACKGROUND

Field

Embodiments of the invention relate to the field of methods of manufacturing camera modules; and more specifically, to methods of aligning a lens assembly with a digital image sensor.

Background

Many portable electronic devices, such as mobile cellular telephones, include a digital camera. The lenses for such cameras must be compact to fit within the case of the portable electronic device. Typically a lens housing contains the lenses. The lens housing is assembled to an image sensor to form a camera module. It is important that the lenses be accurately positioned with respect to the image sensor to provide a high quality camera function in these devices.

The lenses may be positioned with respect to the image sensor by the mechanical alignment of the lens housing to a base plate on which the image sensor is mounted. The accuracy of the position of the lenses with respect to the image sensor depends on the accuracy of the position of the lenses with respect to the lens housing, the accuracy of the position of the lens housing with respect to the base plate, and the accuracy of the position of the image sensor with respect to the base plate. It will be appreciated that the accuracy of the position of the lenses with respect to the image sensor using mechanical alignment is limited because of the multiple positional uncertainties that are introduced.

A process of "active alignment" may be used to reduce the positional uncertainties inherent in mechanical alignment. The active alignment process forms an image on the image sensor using the lenses being assembled and positions the lens housing on the base plate using the image formed by the image sensor to guide the positioning. This can provide an accurate positioning of the lenses with respect to the image sensor but the process is slow when compared to mechanical alignment. Mechanical alignment may allow assembly rates of 1600 units per hour or more while active alignment may be limited to 200 units per hour or less.

It would be desirable to provide a way to accurately align a lens housing with a digital image sensor when the lens housing is assembled to the digital image sensor that provides high assembly rates.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 3A is a pictorial view of a lens housing with an exemplary tracking code.

FIG. 3B is a detail view of the exemplary tracking code on the lens housing of FIG. 3A.

FIG. 4 is a schematic view of an optical device that may be used to characterize a lens subassembly.

DETAILED DESCRIPTION

Figure 1:
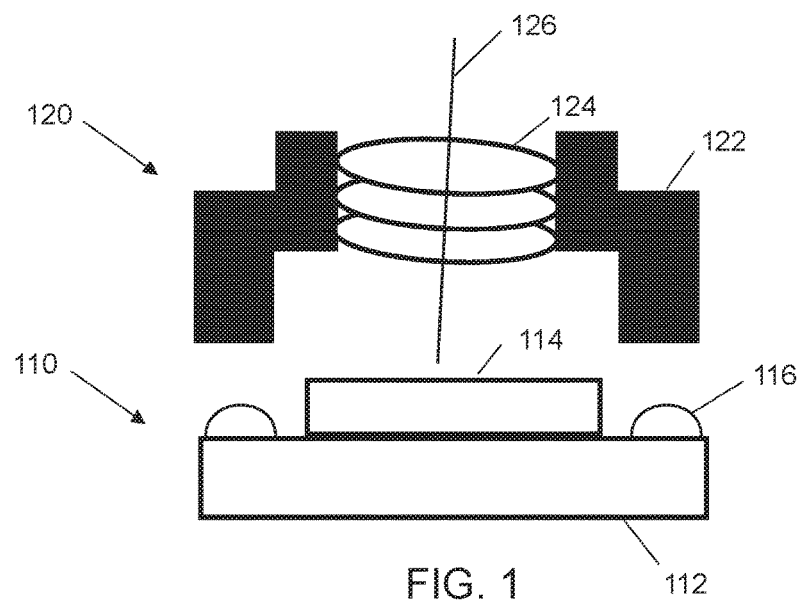
FIG. 1 is a schematic cross-section view of an illustrative assembly process for a camera module.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The term "position" as used herein is to be interpreted as referring to any one or any combination of the six possible degrees of freedom for an object in space. More specifically, "position" includes linear displacement along one, two or three axes, and rotations about one, two or three of those axes. Further, one axis may be designated as the "height" and the intersection of the other two axes may be designated as the "center." Displacements along the one axis may be termed as "adjusting the height." Displacements along the other two axes may be designated as "centering."

Figure 2:
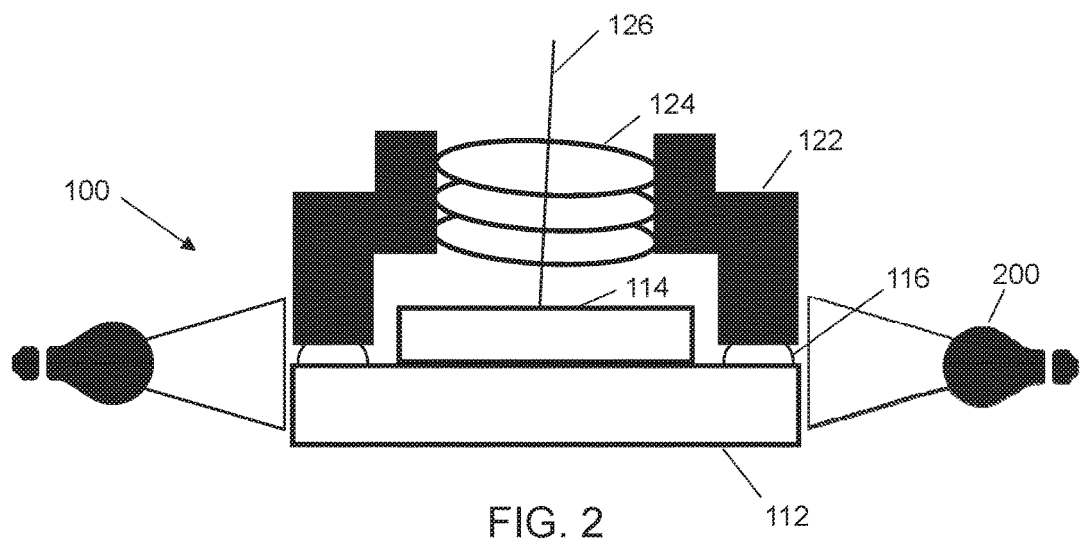
FIG. 2 is a second schematic cross-section view of the illustrative assembly process for a camera module.

FIGS. 1 and 2 are a schematic cross-section view of an illustrative assembly process for a camera module. An image sensor 114 may be attached to a substrate 112 to form an image sensor subassembly 110. One or more lenses 124 may be held in a lens housing 122 to form a lens subassembly 120. Adhesive 116 may be applied to the substrate 112.

As suggested by FIG. 1, the lens subassembly 120 is aligned with the image sensor subassembly 110 with the lens housing 122 held away from the adhesive 116. As suggested by FIG. 2, the lens subassembly 120 is brought toward the image sensor subassembly 110 and the lens housing 122 contacts the adhesive 116. The adhesive 116 may then be cured, such as by ultraviolet (UV) light 200 directed towards the adhesive. The lens subassembly 120 bonded to the image sensor subassembly 110 forms all or part of a camera module 100 that may be used to provide a digital camera in a variety of electronic devices.

The one or more lenses 124 are held in the lens housing 122 along an optical axis 126, which is generally the axis of rotational symmetry for the lenses 124. It will be appreciated that there may be positional tolerances for the placement of individual lenses 124 in the lens housing 122 and the optical axes of multiple lenses held in the lens housing 122 may not be exactly coincident. For the purposes of this description, the optical axis of multiple lenses 124 held in the lens housing 122 should be understood to mean a collective optical axis that best approximates the optical axis of the lens system in terms of optical performance of the lens subassembly 120 as a whole.

It is desirable to have the optical axis 126 of the lens subassembly 120 perpendicular to an image forming surface of the image sensor 114. It may also be desirable to center the optical axis 126 on the image forming surface. If the lens subassembly 120 is aligned with the image sensor subassembly 110 by mechanically aligning the lens housing 122 to the substrate 112, positioning errors of the lenses 124 in the lens housing 122 and of the image sensor 114 on the substrate 112 will lead to positional errors of the optical axis 126 with respect to the image forming surface of the image sensor 114 as suggested by the skewed optical axis shown in FIGS. 1 and 2.

The desired optical precision for positioning the optical axis 126 with respect to the image forming surface of the image sensor 114 may be less than 2 μm error for centering the intersection of the optical axis and the image forming surface of the image sensor. The desired optical precision for rotation or tilt of the optical axis 126 with respect to the image forming surface of the image sensor 114 may be less than 2 arcmin error for perpendicularity to the image forming surface.

It is also desirable to have the lenses 124 precisely located at a back focal distance from the image forming surface of the image sensor 114. The desired optical precision for positioning the lenses 124 with respect to the height of the lenses above the image forming surface of the image sensor 114 may be less than 2 μm error of distance from the image sensor surface.

To provide a more accurate alignment of the optical axis 126 and positioning of the lenses 124 with respect to the image forming surface of the image sensor 114, an enhanced assembly method for camera modules is described herein. The enhanced assembly method places a tracking code on the lens housing 122.

FIG. 3A is a pictorial view of a lens housing 122 with an exemplary tracking code 300. FIG. 3B is a detail view of the exemplary tracking code 300 on the lens housing 122. The tracking code 300 may be a micro-barcode. The micro-barcode may be a two-dimensional (2D) array of laser marked dots. Preferably the tracking code is applied as direct part marking on a portion of the lens housing 122. The laser marked dots may be 20 microns in diameter and the micro-barcode may be 0.34 mm in height. In one exemplary embodiment, a compact, binary encoded barcode using eight bytes of data with error correction may be less than 0.32 mm by 0.32 mm in size. The length of the micro-barcode depends on the length of the tracking code. It will be appreciated that it is not necessary to uniquely identify every lens housing; it is sufficient to uniquely identify every lens housing in a lot that is kept together until the lens housings are assembled into camera modules. Limiting the uniqueness of the tracking codes by lot quantities may allow the use of a shorter tracking code which can be an advantage on lens housings that may have a limited amount of space on which a mark can be applied.

Preferably the tracking code is applied before the lens housing 122 is cleaned and the lenses 124 are mounted in the lens housing. After mounting one or more lenses into the lens housing 122, a back focus distance and a position of an optical axis of the lenses is determined with respect to a datum of the lens housing.

FIG. 4 shows a schematic view of an optical device that may be used to characterize a lens subassembly 110 and determine the back focus distance and the position of the optical axis 126 of the lenses 124. The datum of the lens housing 122 provides a frame of reference for the optical measurements of the lenses 124. The datum may be surface features of the lens housing 122, such as the object side surface 428 and peripheral features, that allow the lens housing to be repeatably held with optical precision. Alternatively, the datum may be surface markings that allow the position of the lens housing 122 to be sensed with optical precision.

If the object side surface 428 and peripheral features of the lens housing 122 provide the datum, the lens subassembly 120 may be placed with the object side surface on a transparent surface 400, such as a sheet of glass, for optical characterization. Alternatively, the lens subassembly 120 may be held by a fixture that provides a clear optical path through the lenses 124.

Optical characterization may be performed by passing light, which may be in form of laser light, through the lenses to determine the location and angle of the optical axis 126 and the back focal distance of the lenses 124 with respect to the datum of the lens housing 122. The lens subassembly 120 may be moved relative to the optical device used for characterization. As suggested by the axes shown in FIG. 4, the lens subassembly 120 may be moved in three axes of translation and two axes of rotation. The position of the optical axis 126 is measured as a displacement in the X and Y directions and as rotations around the X and Y axes, which may be termed pitch and yaw. The tilt of the optical axis 126, characterized by the pitch and yaw, will generally be a more important characteristic of the lenses than the displacement of the optical axis in the X and Y directions. In some embodiments, the displacement of the optical axis 126 in the X and Y directions may not be measured.

The optical axis 126 may be considered as the Z axis. The back focal distance is the distance along the Z axis between the lenses and the image plane where an image of an object at "infinity" is in focus on the image plane. The back focal distance may be determined directly by determining where parallel beams entering the lenses converge. Alternatively, the back focal distance may be computed from the distance to the image plane where an object at a known finite distance in front of the lenses is in focus. Rotation around the Z axis, which may be termed as roll, is generally unimportant for lens alignment although roll may be needed for mechanical alignment of the lens housing 122 and the substrate 112.

The back focus distance, the tilt or position of the optical axis, and the tracking code of the lens housing as determined by the optical characterization are electronically recorded. Optical characterization will generally be performed on a different device than the device used to perform the assembly of the camera module 100 by bonding the lens housing 122 to the substrate 112. Optical characterization and assembly of the camera module may be performed at widely separated times and/or in different geographic locations. The environmental temperature at the time of the optical characterization may be measured and recorded along with the optical characterization data. The optical characterization data may be electronically recorded and stored in an electronically accessible location such as a file store on a local area network (LAN), a wide area network (WAN), or in cloud storage.

Figure 5:
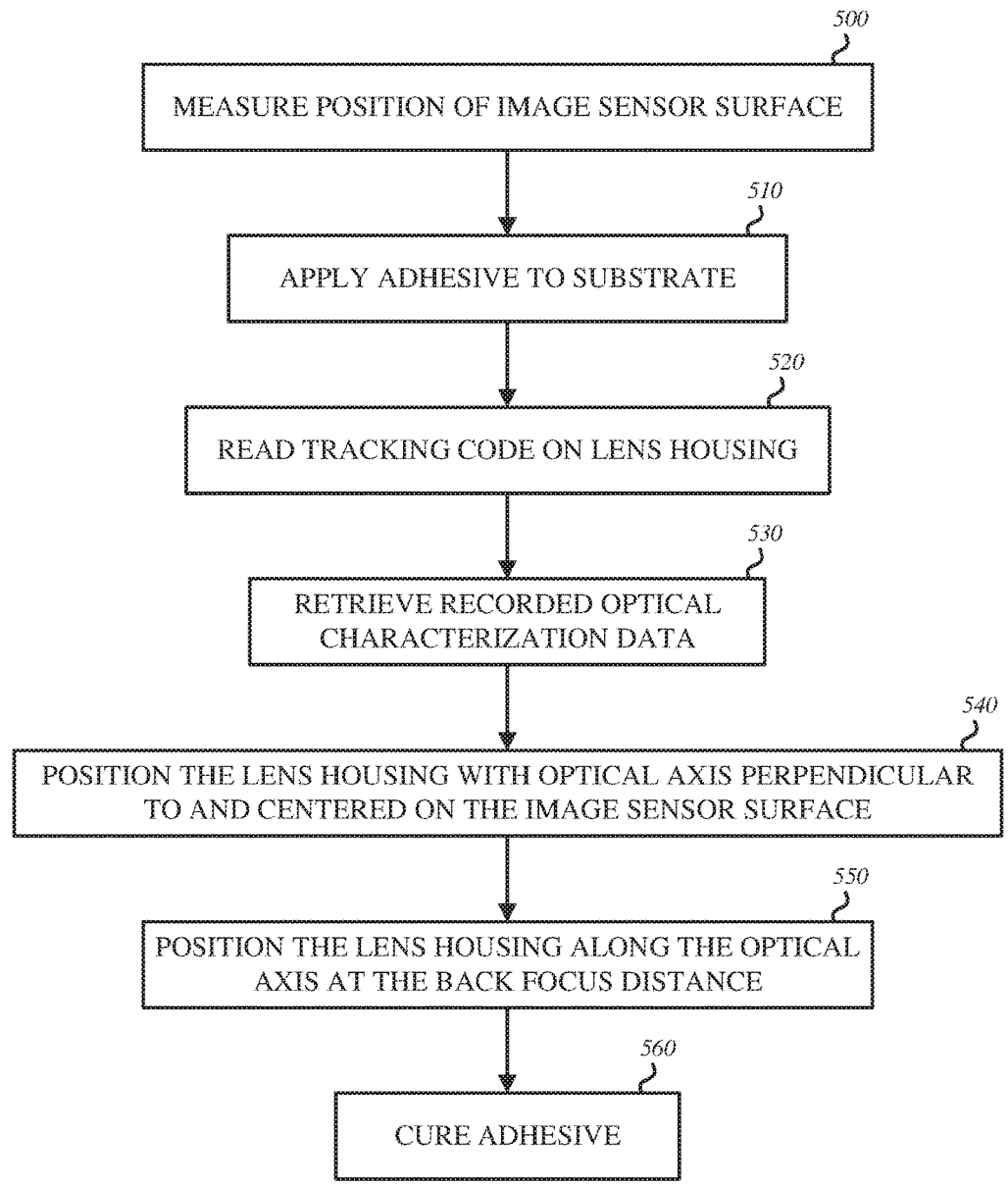
FIG. 5 is a flowchart for the assembly of a camera module.

FIG. 5 is a flowchart for the assembly of the camera module.

Figure 6:
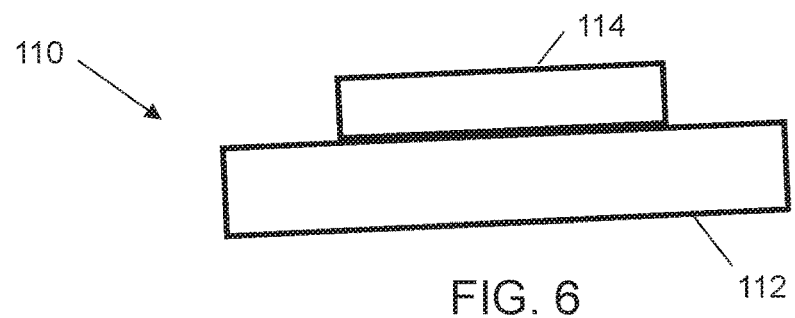
FIG. 6 is a schematic cross-section view of an illustrative image sensor mounted on a substrate.

FIG. 6 is a schematic cross-section view of an illustrative image sensor mounted on a substrate. The image sensor subassembly 110 is prepared to receive a lens subassembly by measuring 500 a position of an image sensor surface on the image sensor 114. The position of the image sensor surface may be measured preferably by optical means to avoid contact with the image sensor. The plane of the image sensor surface and a perpendicular axis at the center of the image sensor surface form a frame of reference for the positioning of the lens subassembly. The substrate may be held in a fixed position and the remainder of the assembly process may use a frame of reference based on the measured position of the image sensor surface. Alternatively, the substrate 112 may be held in bonding head that moves the image sensor subassembly 110 to a standardized position that forms the frame of reference for the remainder of the assembly process.

Figure 7:
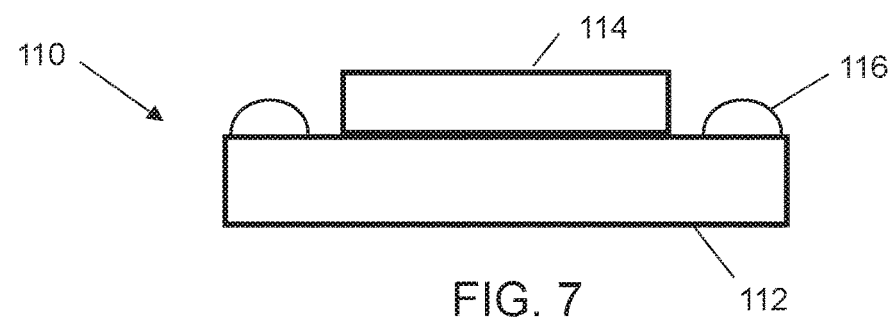
FIG. 7 is a schematic cross-section view of the substrate with an adhesive applied to the substrate.

FIG. 7 is a schematic cross-section view of the substrate 112 with an adhesive 116 applied to the substrate 510. The adhesive may be a UV curable adhesive. The adhesive must of course be prevented from contaminating the image sensor surface on the image sensor. The assembly process is arranged to minimize operations that could spread the adhesive unnecessarily. The substrate 112 is shown as moved to a standardized position as suggested by the leveling of the image sensor 114.

Figure 8:
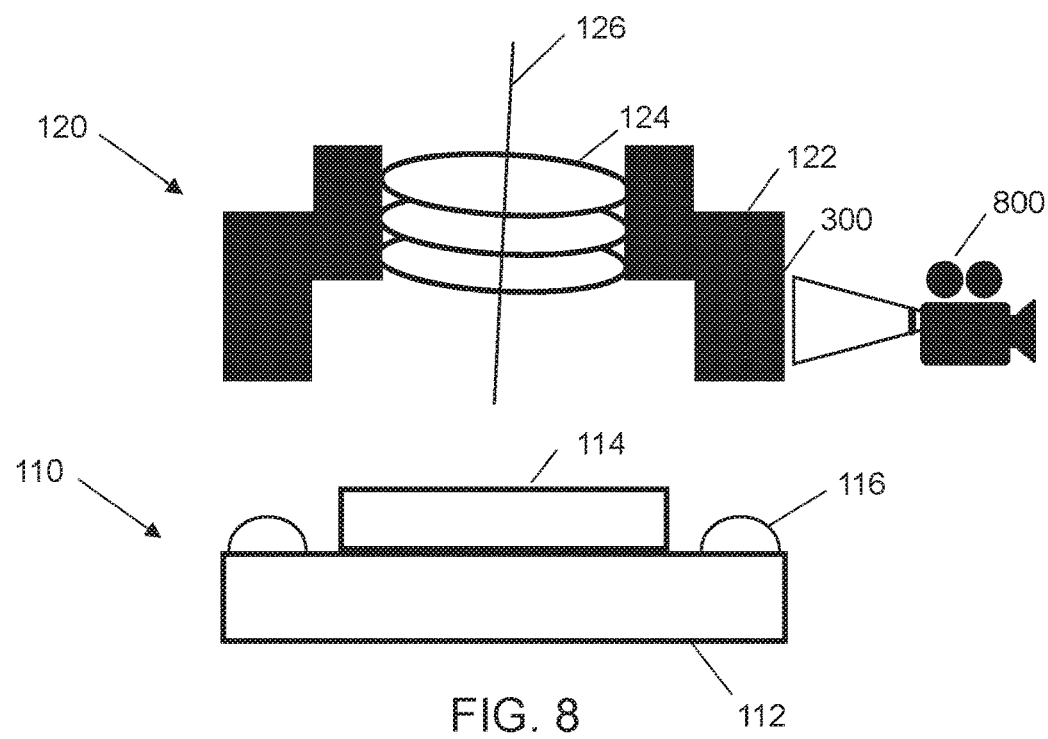
FIG. 8 is a schematic cross-section view of the lens subassembly and a bar code scanning device.

FIG. 8 is a schematic cross-section view of the lens subassembly 120 where the tracking code 300 applied to the lens housing 122 is read 520 by a bar code scanning device 800. The tracking code is used to look up the optical characterization data for the lenses in the lens housing. The optical characterization data includes the back focus distance and the position, both translation and tilt, of the optical axis of the lenses with respect to the datum of the lens housing. The optical characterization data for the lens housings may be retrieved from an electronically accessible location such as a file store on a local area network (LAN), a wide area network (WAN), or in cloud storage 530. While the figure suggests that the lens subassembly 120 is adjacent the image sensor subassembly 110 when the tracking code 300 is read, it will be appreciated that the tracking code 300 may be read before the lens subassembly is moved to be adjacent the image sensor subassembly.

The assembly of the camera module 100 may be performed in less than 3 seconds, a rate of more than 1200 units per hour. To avoid delays in the assembly process, the optical characterization data for lens housings to be assembled may be retrieved prior to beginning the assembly process. Further, the device that performs the assembly operations may be preloaded with the optical characterization data for all the lens housings that are loaded in the device at the outset of the assembly operation. Alternatively, a "read ahead" technique may be used to retrieve the optical characterization data for lens housings that are staged for assembly at some time prior to assembling a lens module so that variations in the time needed to retrieve the optical characterization data does not affect the rate at which camera modules are assembled.

Figure 9:
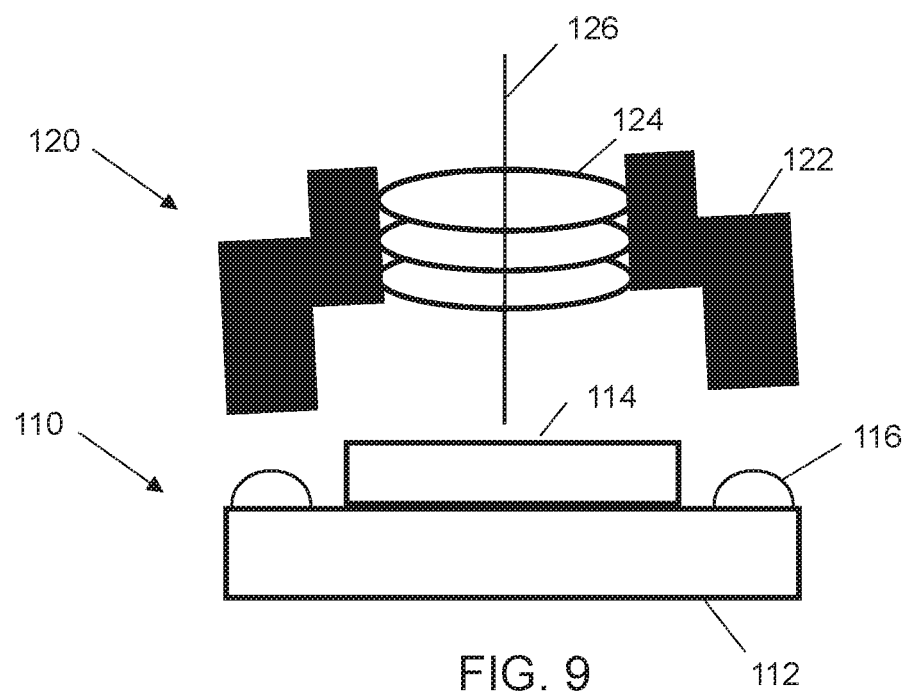
FIG. 9 is a schematic cross-section view of the lens subassembly in a first position relative to the image sensor subassembly.

FIG. 9 is a schematic cross-section view of the lens subassembly 120 with the lens housing 122 positioned such that the optical axis 126 of the lenses 124 is perpendicular to, and in some embodiments centered on, the image sensor surface using the measured position of the image sensor surface and the electronically recorded tilt or position of the optical axis for the tracking code of the lens housing 540. The lens housing is held in a bonding head that has at least three axes of motion—Z, pitch, and yaw. The bonding head may have two additional axes of motion, X and Y, that are used to center the optical axis 126 on the image sensor surface. The bonding head may have an additional axis of rotation, roll, that is used to mechanically align the lens housing 122 to the substrate 112 without affecting the optical alignment of the lenses to the image sensor surface. The lens housing 122 is held away from the adhesive 116 on the substrate 112 as these positioning movements are made. If the bonding head provides a sixth axis of rotation, it may be used at this point to mechanically align the lens housing 122 to the substrate 112.

Figure 10:
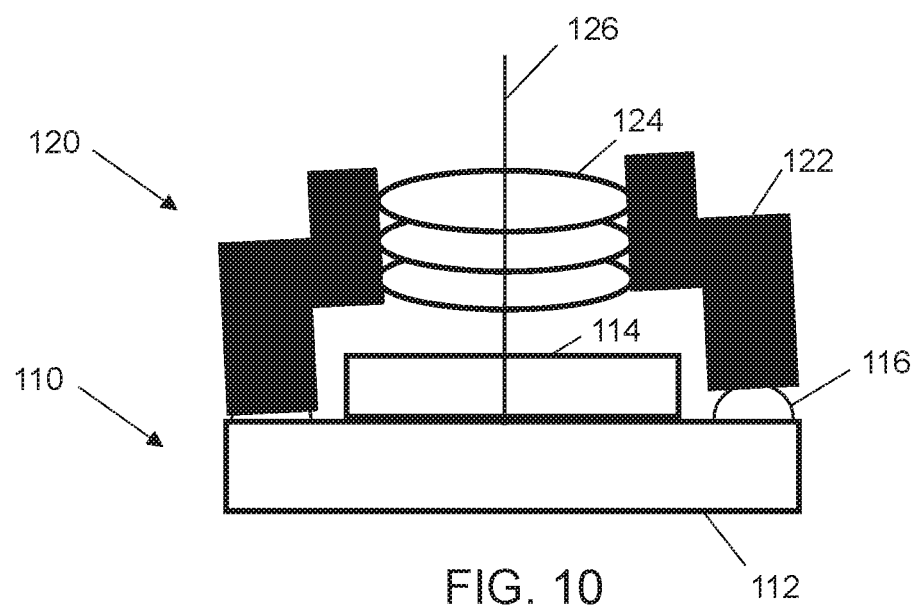
FIG. 10 is a schematic cross-section view of the lens subassembly in a second position relative to the image sensor subassembly.

FIG. 10 is a schematic cross-section view of the lens subassembly 120 with the lens housing 122 having been positioned along the optical axis 126 to place the lenses 124 at the back focal distance from the image sensor surface using the measured position of the image sensor surface and the electronically recorded back focus distance for the tracking code of the lens housing 550. This positioning movement moves the lens housing 122 toward the substrate 112 along the optical axis 126. Thus the lens housing 122 is pressed into the adhesive 116 without rotation or translation after the lens housing makes contact with the adhesive. This minimized the displacement of the adhesive 116 and lessens the likelihood of contaminating the image sensor 114 with adhesive.

The adhesive 116 is then cured while holding the lens housing 122 in the position determined from the measured position of the image sensor surface and the electronically recorded optical characteristics of the lenses in the lens housing 560.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method of assembling a camera module, the method comprising:
   applying a tracking code to a lens housing;
   mounting one or more lenses into the lens housing;
   determining optical measurements of the lenses with respect to a datum of the lens housing;
   electronically recording the optical measurements and the tracking code of the lens housing;
   measuring a position of an image sensor surface of an image sensor mounted on a substrate;
   reading the tracking code on the lens housing;
   applying an adhesive to the substrate;
   positioning the lens housing with respect to the image sensor surface using the optical measurements corresponding to the tracking code on the lens housing and the datum of the lens housing; and
   curing the adhesive.

2. The method of claim 1, wherein the optical measurements of the lenses include a back focus distance and a tilt of an optical axis of the lenses with respect to the datum of the lens housing.

3. The method of claim 2, wherein positioning the lens housing with respect to the image sensor surface is such that the optical axis is perpendicular to the image sensor surface and the lenses are separated from the image sensor surface according to the electronically recorded back focus distance for the tracking code of the lens housing.

4. The method of claim 2, wherein the datum of the lens housing is an object side surface of the lens housing.

5. The method of claim 4, wherein determining the back focus distance and the tilt of the optical axis of the lenses further comprises:
   placing the datum of the lens housing on a transparent surface; and
   characterizing the lenses by transmitting light through the lenses and the transparent surface.

6. The method of claim 1, wherein the datum of the lens housing is surface markings that allow the position of the lens housing to be sensed with optical precision.

7. The method of claim 1, wherein applying the tracking code further comprises laser marking a 2D barcode on the lens housing.

8. The method of claim 7, further comprising cleaning the lens housing after applying the tracking code and before mounting lenses into the lens housing.

9. A method of preparing a lens housing for assembly, the method comprising:
   applying a tracking code to the lens housing;
   mounting one or more lenses into the lens housing;
   determining optical measurements of the lenses with respect to a datum of the lens housing; and
   electronically recording the optical measurements and the tracking code of the lens housing, wherein electronically recording comprises associating the optical measurements with the tracking code.

10. The method of claim 9, wherein the optical measurements of the lenses include a back focus distance and a tilt of an optical axis of the lenses with respect to the datum of the lens housing.

11. The method of claim 10, wherein the datum of the lens housing is an object side surface of the lens housing.

12. The method of claim 11, wherein determining the back focus distance and the tilt of the optical axis of the lenses further comprises:
   placing the datum of the lens housing on a transparent surface; and
   characterizing the lenses by transmitting light through the lenses and the transparent surface.

13. The method of claim 9, wherein the datum of the lens housing is surface markings that allow a position of the lens housing to be sensed with optical precision.

14. The method of claim 9, wherein applying the tracking code further comprises laser marking a 2D barcode on the lens housing.

15. The method of claim 14, further comprising cleaning the lens housing after applying the tracking code and before mounting lenses into the lens housing.

16. A method of assembling a camera module, the method comprising:
   measuring a position of an image sensor surface of an image sensor mounted on a substrate;
   reading a tracking code on a lens housing, wherein the lens housing contains one or more lenses for which optical measurements with respect to a datum of the lens housing have been electronically recorded and associated with the tracking code;
   applying an adhesive to the substrate;
   positioning the lens housing with respect to the image sensor surface using the optical measurements corresponding to the tracking code on the lens housing and the datum of the lens housing; and
   curing the adhesive.

17. The method of claim 16, wherein the optical measurements of the lenses include a back focus distance and a tilt of an optical axis of the lenses with respect to the datum of the lens housing.

18. The method of claim 17, wherein positioning the lens housing with respect to the image sensor surface is such that the optical axis is perpendicular to the image sensor surface and the lenses are separated from the image sensor surface according to the electronically recorded back focus distance for the tracking code of the lens housing.

19. The method of claim 17, wherein positioning the lens housing with respect to the image sensor surface further comprises positioning the lens housing such that the optical axis is perpendicular to the image sensor surface before positioning the lens housing along the optical axis such that the lenses are separated from the image sensor surface using the electronically recorded back focus distance.

20. The method of claim 16, wherein the method is performed by an assembly system that is loaded with a plurality of lens housings and a plurality of optical measurements associated with a plurality of tracking codes for the plurality of lens housings loaded in the assembly system.

* * * * *